(12) United States Patent
Perrelle et al.

(10) Patent No.: US 6,262,854 B1
(45) Date of Patent: Jul. 17, 2001

(54) MAGNIFYING DEVICE FOR A SHOPPING CART

(76) Inventors: Timothy J. Perrelle, 120 11th Ave., Racine, WI (US) 53403; Brenda J. Meyer, 4854 N. 87th St., Milwaukee, WI (US) 53225

(*) Notice: Subject to any disclaimer, the term of this patent is extended or adjusted under 35 U.S.C. 154(b) by 0 days.

(21) Appl. No.: 09/585,529

(22) Filed: Jun. 2, 2000

(51) Int. Cl.[7] .................................................. G02B 27/02
(52) U.S. Cl. ........................................................ 359/802
(58) Field of Search ........................... 359/802, 806; 33/488; D16/135; 40/308; 248/444.1

(56) References Cited

U.S. PATENT DOCUMENTS

| | | | |
|---|---|---|---|
| D. 278,348 | 4/1985 | Horgan | D16/135 |
| 4,021,953 | 5/1977 | Couch | 40/308 |
| 4,324,050 | 4/1982 | Weir | 33/488 |
| 4,331,381 | 5/1982 | Hunter | 359/442 |
| 4,685,647 | 8/1987 | Calhoun | 248/444.1 |
| 5,119,239 | 6/1992 | Iaquinto et al. | 359/811 |

*Primary Examiner*—Ricky Mack

(57) ABSTRACT

A magnifying device for a shopping cart for magnifying information located on items to be purchased. The magnifying device for a shopping cart includes a frame portion. The frame portion has a peripheral wall and an opening therein. A magnifying means for magnifying objects is mounted to the peripheral wall such that the magnifying means extends over the opening. A coupling means for pivotally couples the frame portion to a shopping cart. The coupling means is integrally coupled to and extends away from the peripheral wall. The coupling means is adapted to is pivotally mounted to the bar.

6 Claims, 2 Drawing Sheets

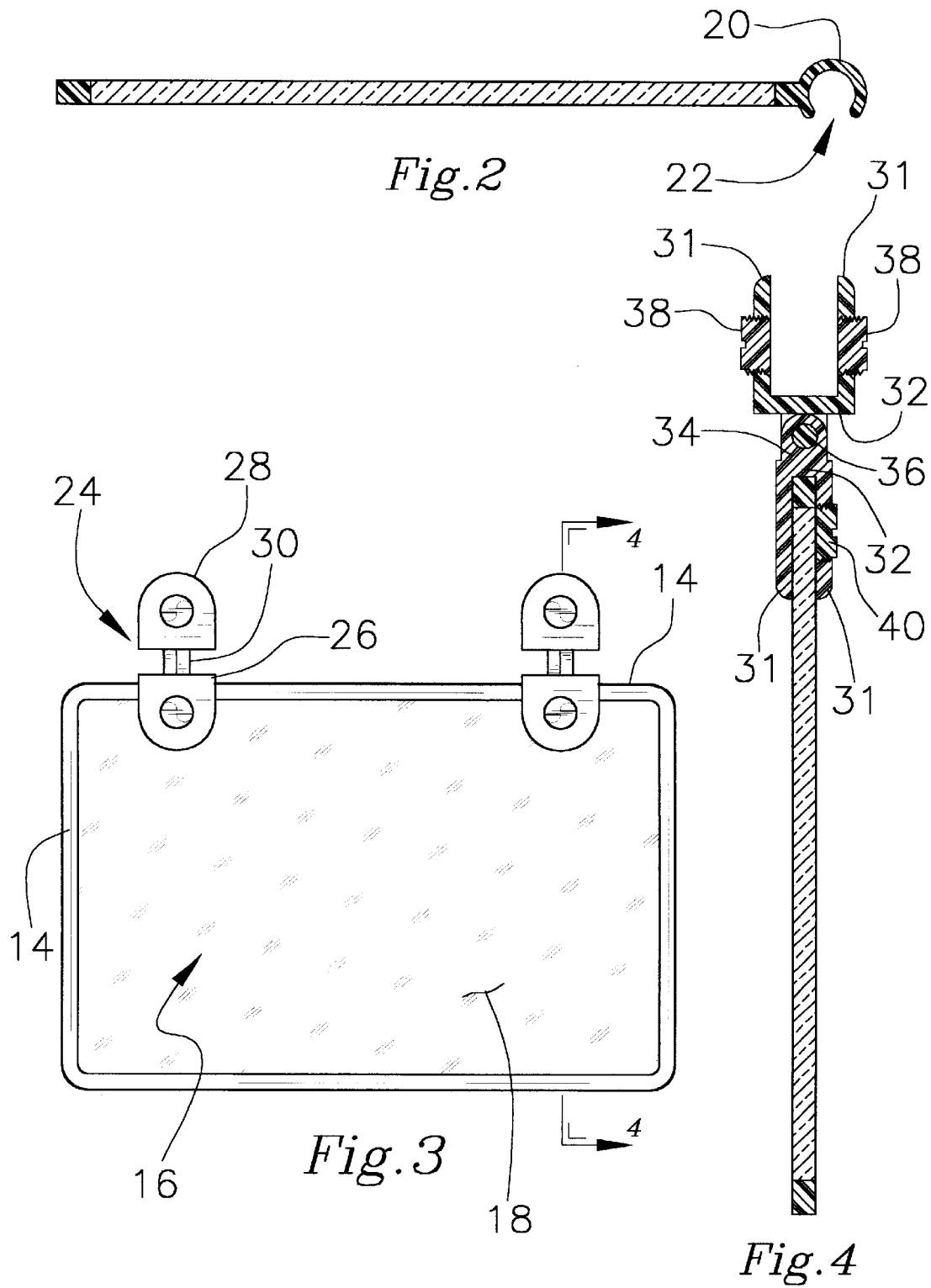

MAGNIFYING DEVICE FOR A SHOPPING CART

BACKGROUND OF THE INVENTION

1. Field of the Invention

The present invention relates to magnifying devices and more particularly pertains to a new magnifying device for a shopping cart for magnifying information located on items to be purchased.

2. Description of the Prior Art

The use of magnifying devices is known in the prior art. More specifically, magnifying devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,021,953; 4,331,381; 5,119,239; 4,685,647; 4,324,050; and U.S. Des. Pat. No. 278,348.

While these devices fulfill their respective, particular objectives and requirements, the aforementioned patents do not disclose a new magnifying device for a shopping cart. The inventive device includes a frame portion. The frame portion has a peripheral wall and an opening therein. A magnifying means for magnifying objects is mounted to the peripheral wall such that the magnifying means extends over the opening. A coupling means for pivotally couples the frame portion to a shopping cart. The coupling means is integrally coupled to and extends away from the peripheral wall. The coupling means is adapted to is pivotally mounted to the bar.

In these respects, the magnifying device for a shopping cart according to the present invention substantially departs from the conventional concepts and designs of the prior art, and in so doing provides an apparatus primarily developed for the purpose of magnifying information located on items to be purchased.

SUMMARY OF THE INVENTION

In view of the foregoing disadvantages inherent in the known types of magnifying devices now present in the prior art, the present invention provides a new magnifying device for a shopping cart construction wherein the same can be utilized for magnifying information located on items to be purchased.

The general purpose of the present invention, which will be described subsequently in greater detail, is to provide a new magnifying device for a shopping cart apparatus and method which has many of the advantages of the magnifying devices mentioned heretofore and many novel features that result in a new magnifying device for a shopping cart which is not anticipated, rendered obvious, suggested, or even implied by any of the prior art magnifying devices, either alone or in any combination thereof.

To attain this, the present invention generally comprises a frame portion. The frame portion has a peripheral wall and an opening therein. A magnifying means for magnifying objects is mounted to the peripheral wall such that the magnifying means extends over the opening. A coupling means for pivotally couples the frame portion to a shopping cart. The coupling means is integrally coupled to and extends away from the peripheral wall. The coupling means is adapted to is pivotally mounted to the bar.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new magnifying device for a shopping cart apparatus and method which has many of the advantages of the magnifying devices mentioned heretofore and many novel features that result in a new magnifying device for a shopping cart which is not anticipated, rendered obvious, suggested, or even implied by any of the prior art magnifying devices, either alone or in any combination thereof.

It is another object of the present invention to provide a new magnifying device for a shopping cart which may be easily and efficiently manufactured and marketed.

It is a further object of the present invention to provide a new magnifying device for a shopping cart which is of a durable and reliable construction.

An even further object of the present invention is to provide a new magnifying device for a shopping cart which is susceptible of a low cost of manufacture with regard to both materials and labor, and which accordingly is then susceptible of low prices of sale to the consuming public, thereby making such magnifying device for a shopping cart economically available to the buying public.

Still yet another object of the present invention is to provide a new magnifying device for a shopping cart which provides in the apparatuses and methods of the prior art some of the advantages thereof, while simultaneously overcoming some of the disadvantages normally associated therewith.

Still another object of the present invention is to provide a new magnifying device for a shopping cart for magnifying information located on items to be purchased.

Yet another object of the present invention is to provide a new magnifying device for a shopping cart which includes a frame portion. The frame portion has a peripheral wall and an opening therein. A magnifying means for magnifying objects is mounted to the peripheral wall such that the magnifying means extends over the opening. A coupling means for pivotally couples the frame portion to a shopping cart. The coupling means is integrally coupled to and extends away from the peripheral wall. The coupling means is adapted to is pivotally mounted to the bar.

Still yet another object of the present invention is to provide a new magnifying device for a shopping cart that is pivotally mounted on the shopping cart for easy access by a customer.

Even still another object of the present invention is to provide a new magnifying device for a shopping cart that may be easily coupled to any shopping cart.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic side cross-sectional view taken along line 2—2 of the present invention.

FIG. 3 is a schematic front view of the second embodiment of the present invention.

FIG. 4 is a schematic side cross-sectional view taken along line 4—4 of the second embodiment of the present invention.

DESCRIPTION OF THE PREFERRED EMBODIMENT

Figure 1:
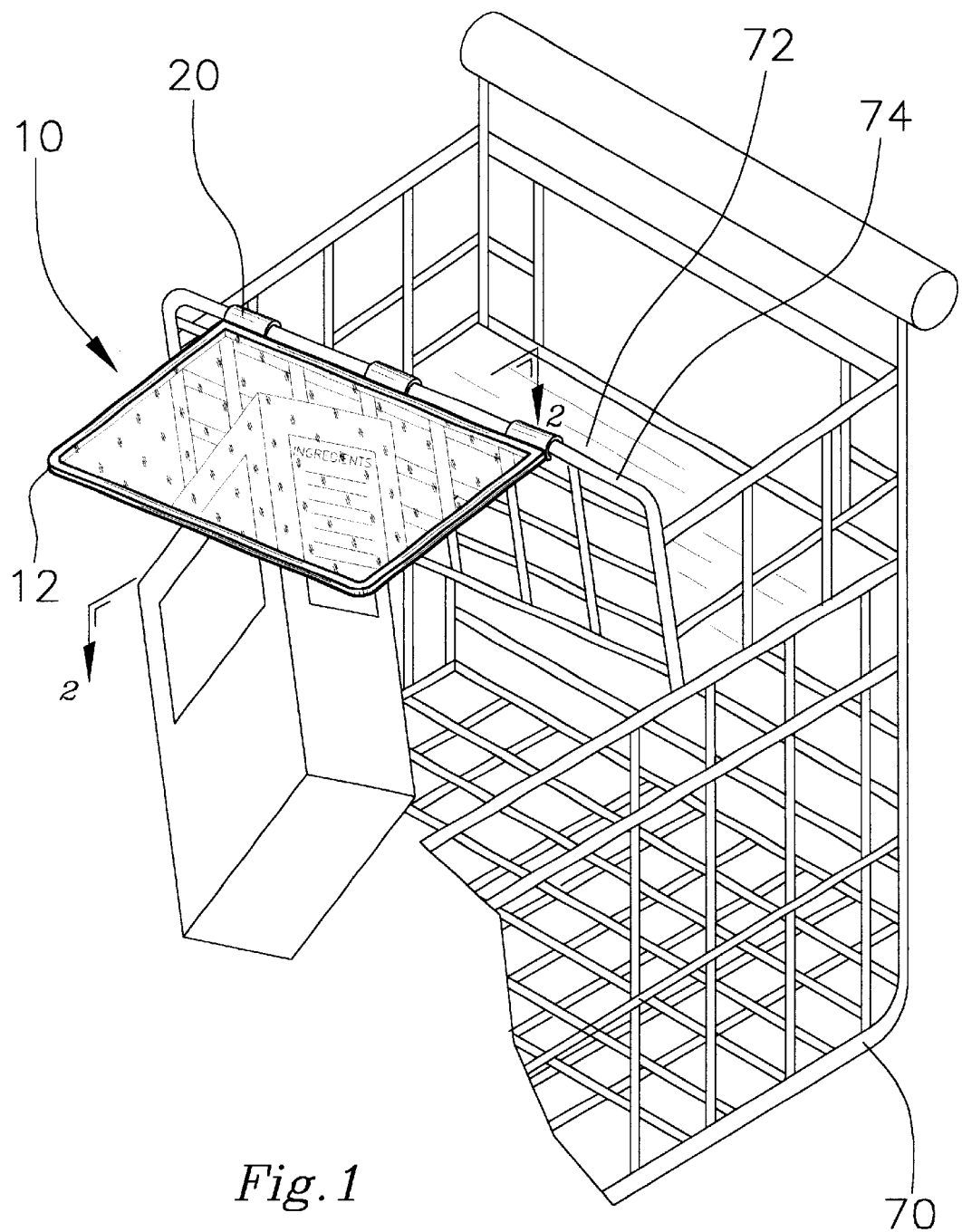
FIG. 1 is a schematic perspective in use view of a new magnifying device for a shopping cart according to the present invention.

With reference now to the drawings, and in particular to FIGS. 1 through 4 thereof, a new magnifying device for a shopping cart embodying the principles and concepts of the present invention and generally designated by the reference numeral 10 will be described.

As best illustrated in FIGS. 1 through 4, the magnifying device for a shopping cart 10 generally comprises a frame portion 12. The frame portion comprises two pairs of spaced lateral walls 14 which form a peripheral wall of the frame. The lateral walls 14 are integrally coupled together such that the frame portion 12 has a rectangular shape. The frame has an open area 16, or window, therein. The frame portion 12 preferably comprises a plastic material.

A magnifying means 18 magnifies objects. The magnifying means 18 comprises a conventional lens. The lens is fixedly mounted to the lateral walls 14 such that the lens extends across the open area 16 in the frame portion 12. The lens ideally comprises a plastic material.

A coupling means pivotally couples the frame portion to the shopping cart. The coupling means in the first embodiment comprises a plurality of annular members 20. Each of the annular members is integrally coupled to an outside edge of one of the lateral walls 14 and each is spaced from each other. The annular members 20 are positioned such that the annular members are generally co-axial. Each of the annular members has a break 22 therein. The plurality of annular members 20 is preferably three annular members. Each of the annular members 20 comprises a plastic material. The bar 74 defining the top edge of a child seat 72 in a shopping cart 70 is placed through the break 22 such that the annular members 20 are pivotally coupled to the bar 74 of the shopping cart 70. The annular members 20 are snapped onto the bar 74 and are relatively difficult to remove from the bar 74.

In the second embodiment shown in FIGS. 3 and 4, the coupling means comprises a pair of brackets 24. Each of the brackets 24 have a first portion 26 and a second portion 28. The first portion 26 is removably coupled to the frame portion 12. The second portion 28 is removably coupled to the bar 74. Each of the brackets 24 has a middle portion 30 comprising a hinge such that the first 26 and second 28 portions may pivot with respect to each other. Preferably, the first 26 and second 28 portions each comprises a U-shaped bracket having two legs 31 and rod 32 therebetween. The rods 32 each have a lug 34 thereon. The lugs 34 extend toward each other and are hingedly coupled together by a pin 36. Each of the legs 31 for the second portion 28 has a fastening means 38 therein for removably fastening the second portion 28 to the bar 74. The fastening means 38 is preferably a one-way screw such that it is not removably fastenable. Each of the fastening means 38 comprises a screw extending through a leg. The first portion 26 has a leg 31 having a securing 40 means extending therethrough for removably securing the frame 12 between the legs 31 of the first portion 26. The securing means 40 comprises a screw. The screws are preferably one-way nylon screws.

Once the device is coupled to the shopping cart, customers may use the magnifying means to magnify the ingredients and pricing which is on the articles of food and manufacture.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A magnifying device for shopping carts, said device being pivotally couplable to a child seat portion of a shopping cart, the child seat portion having a bar defining a top edge of the seat portion, said device comprising:

a frame portion, said frame portion having a peripheral wall and an opening therein;

a magnifying means for magnifying objects, being mounted to said peripheral wall such that said magnifying means extends over said opening; and a coupling means for pivotally coupling said frame portion to the shopping cart, said coupling means being integrally coupled to and extending away from said peripheral wall, said coupling means being adapted to being pivotally mounted to said bar.

2. The magnifying device for shopping carts as in claim 1, wherein said peripheral wall comprises:

two pairs of spaced lateral walls, said lateral walls being integrally coupled together such that said frame portion generally has a rectangular shape.

3. The magnifying device for shopping carts as in claim 2, wherein said coupling means comprises:

said coupling means comprising a plurality of annular members, each of said annular members being coupled to an outside edge of one of said lateral walls and being spaced from each other, said annular members being positioned such that said annular members are generally co-axial; and wherein said bar is placed through said break such that said annular members are pivotally coupled to the bar of the shopping cart, wherein said annular members are relatively difficult to remove from said bar.

4. The magnifying device for shopping carts as in claim 1, wherein said coupling means comprises:

a pair of brackets, each of said brackets having a first portion and a second portion, said first portion being removably coupled to said frame portion, a second portion being removably coupled to said bar, each of said brackets having a middle portion comprising a hinge such that said first and second portions may pivot with respect to each other.

5. The magnifying device for shopping carts as in claim 4, wherein said coupling means further comprises:

said first and second portions each comprising U-shaped brackets each having two legs and rod therebetween, said rods each having a lug thereon, said lugs extending toward each other and being hingedly coupled together by a pin, each of said legs for said second portion having a fastening means therein for removably fastening said second portion to said bar, each of said fastening means comprising a screw extending through a leg, said first portion having a leg having a securing means extending therethrough for removably securing said frame between said legs of said first portion, said securing means comprising a screw.

6. A magnifying device for shopping carts, said device being pivotally couplable to a child seat portion of a shopping cart, the child seat portion having a bar defining a top edge of the seat portion, said device comprising:

a frame portion, said frame portion comprising two pairs of spaced lateral walls, said lateral walls being integrally coupled together such that said frame portion generally has a rectangular shape, said frame having a generally open area therein, said frame portion comprising a plastic material;

a magnifying means for magnifying objects, said magnifying means comprising a lens, said lens being fixedly mounted to said lateral walls such that said lens extends across said open area in said frame portion, said lens comprising a plastic material;

a coupling means for pivotally coupling said frame portion to the shopping cart, said coupling means comprising a plurality of annular members, each of said annular members being integrally coupled to an outside edge of one of said lateral walls and being spaced from each other, said annular members being positioned such that said annular members are generally co-axial, each of said annular members having a break therein, said plurality of annular members being three annular members, each of said annular members comprising a plastic material; and wherein said bar is placed through said break such that said annular members are pivotally coupled to the bar of the shopping cart, wherein said annular members are relatively difficult to remove from said bar.

\* \* \* \* \*